United States Patent [19]

Roberts

[11] Patent Number: 4,824,192

[45] Date of Patent: Apr. 25, 1989

[54] OPTICAL PROCESSING

[75] Inventor: Nicholas C. Roberts, Bristol, United Kingdom

[73] Assignee: British Aerospace Public Limited Company, London, England

[21] Appl. No.: 109,045

[22] Filed: Oct. 16, 1987

[30] Foreign Application Priority Data

Oct. 18, 1986 [GB] United Kingdom ................. 8625016

[51] Int. Cl.[4] ........................... G02B 5/32; G06F 7/56

[52] U.S. Cl. .................................... 350/3.73; 364/713

[58] Field of Search ....................... 350/3.7, 3.72, 3.73, 350/320; 364/713, 822

[56] References Cited

U.S. PATENT DOCUMENTS

| | | | |
|---|---|---|---|
| 4,386,414 | 5/1983 | Case | 364/713 X |
| 4,703,993 | 11/1987 | Hinton et al. | 350/3.72 |
| 4,705,344 | 11/1987 | Hinton et al. | 350/3.73 |
| 4,764,889 | 8/1988 | Hinton et al. | 364/713 X |
| 4,764,890 | 8/1988 | Hinton | 350/3.72 X |

FOREIGN PATENT DOCUMENTS

| | | | |
|---|---|---|---|
| 86/03849 | 7/1986 | World Int. Prop. O. | 350/3.6 |

*Primary Examiner*—John K. Corbin
*Assistant Examiner*—David J. Edmondson
*Attorney, Agent, or Firm*—Nixon & Vanderhye

[57] ABSTRACT

An optical processor includes a non-linear spatial light modulator defining an array of logic gates and having an output plane 10 ) and an input plane 12. The array is made up of a plurality of cells 14 each containing a plurality of logic gates 16. A lenslet array 18 comprising an array of lenslets 20 associated one with each cell 14 respectively focusses the oututs of the cells onto respective facets 22 of a holographic array 24. Each facet of the holographic array defines a predetermined mapping or routing configuration to map the respective cell onto the input plane 12. The cells may be mapped either precisely onto the predetermined cell of the input plane or in cell-shifted fashion. An optical processor is described which employs the arrangement illustrated in FIG. 1 to enable asembly of a plurality of similar interacting modules for implementing a regular algorithm such as a fast multiplier array.

8 Claims, 6 Drawing Sheets

OPTICAL PROCESSING

BACKGROUND OF THE INVENTION

This invention relates to optical processors and to methods of processing optical data, and in particular, though not exclusively, to processors and methods for implementing digital processing techniques.

In digital optical processing techniques, optical signals are subjected to logic operations by means of a non-linear device. Devices capable of performing logic operations may be in the form of non-linear spatial light modulators (SLMs), for example liquid crystal cells and interference cells. An example of a liquid crystal cell is that known as the Liquid Crystal Light Valve (LCLV) manufactured by Hughes Aircraft Corporation. Logic circuits may be created using SLMs as arrays of logic gates and an interconnection system and an imaging system to provide the necessary interconnections between the gate outputs of the array and the gate inputs. Two dimensional arrays of logic operations such as OR, NOR, AND, NAND, XOR and XNOR have been demonstrated in this way using a variety of optically addressed SLMs.

Two kinds of interconnections are described in "Architectural implications of a digital optical processor", Jenkins et al, Applied Optics, Vol. 23. No. 19 (October 1984) p. 3465–3474. The space variant interconnection method provides the most general interconnection system in which any gate output can be connected to any one of one or more gate inputs. This system is known as a space-variant interconnection system because the response of the system varies across the input to the interconnection system, so that each gate output sees a different routing configuration. One hologram element or "facet" is required for each logic gate. Clearly, while this system offers great flexibility due to the large number of different routing configurations provided, it is disadvantageous because it requires one facet for each logic gate. There is a limit on the number of facets that can be included on a hologram in an interconnection system, because of the need to maintain the space-bandwidth product (SWBP) at an acceptable level. This means that the space variant system is not suitable for many practical applications.

In the space invariant interconnection system, a single hologram provides a common routing configuration for all the logic gate outputs, so that the configuration defined for each gate output in the array is the same. This system avoids the disadvantages of the space variant interconnection system because it only requires one hologram for the whole output array, but is severely limited in its lack of flexibility in routing configuration. For practical use it requires that particular circuits be implemented by disabling the appropriate logic gates and this requires a separate addressing.

The reference identified above also discloses a hybrid system in which the gate outputs are distributed by means of a first holographic array onto the facets of a second holographic array. The second holographic array defines a finite number of interconnection patterns which is less than the number of the gates. However, the first hologram still have a facet for each of the logic gates in the array, and thus many facets are required.

The embodiment of processor described below does not require a facet for each logic gate but still allows sufficient flexibility in routing for algorithms of a regular structure.

SUMMARY OF THE INVENTION

According to one aspect of this invention, there is provided an optical processor including a logic gate array having an input plane and an output plane, and a holographic array for mapping the output plane of the logic gate array onto the input plane in accordance with a predetermined routing configuration, said logic gate array including a plurality of cells each containing a plurality of logic gates, said holographic array including a plurality of facets each for receiving the output of a respective cell, each of the facets defining a predetermined routing configuration between the associated cell output and the input plane of said logic gate array.

According to another aspect of this invention there is provided a method of processing optical data in a processor including a logic gate array and a holographic array for distributing the outputs of the array between the inputs thereof, said method comprising mapping selected cells of said output onto selected cells of said input thereby to define a plurality of interacting modules each defining substantially the same logic circuit, and each having a predetermined interaction with at least one other module.

BRIEF DESCRIPTION OF THE DRAWINGS

The invention will now be described by way of non-limiting example, reference being made to the accompanying drawings, in which.

DETAILED DESCRIPTION OF A PREFERRED EMBODIMENT

Figure 1:
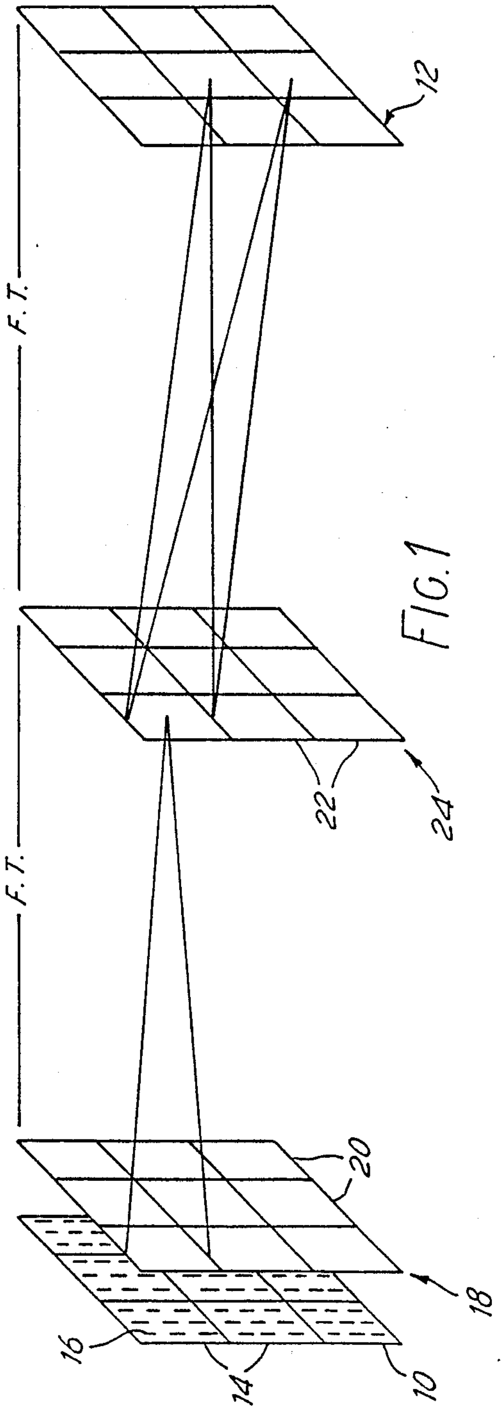
FIG. 1 is a schematic diagram illustrating an interconnection system for use in an optical processor according to an embodiment of this invention.
Figure 3:
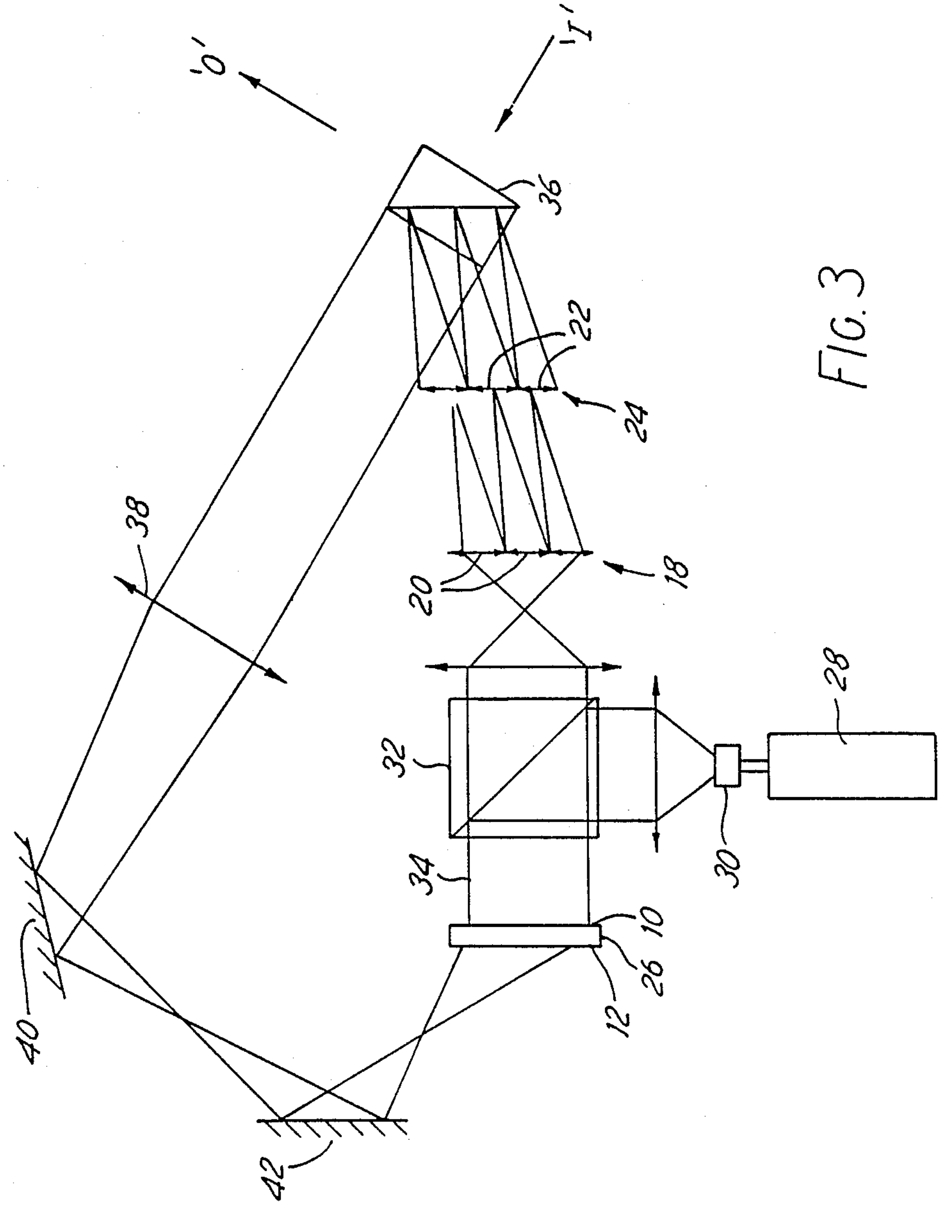
FIG. 3 is a diagram illustrating an optical processor according to an embodiment of the invention.

Referring to FIG. 1, this shows the output and input planes 10 and 12 respectively of a logic gate array, e.g. a Liquid Crystal Light Valve. It will be understood that the planes are on opposed surfaces of the logic gate array and that the representation in FIG. 1 is for purposes of explanation only. In a practical system, for example as illustrated in FIG. 3, the output from the holographic array is transferred to the input plane of the logic gate array by a series of mirrors, so that patterns incident on the gate input array match the patterns on the gate output array.

The logic gate array is divided into an array of cells 14 each containing a number of gates 16. A lenslet array 18 provides a lenslet 20 for each cell 14 of the logic gate array so that the output signals of the gates within the cell are Fourier Transformed onto a respective facet 22 of a holographic array 24. There is a one to one correspondence between the cells of the output plane and the lenslets 20 of the array 18.

Each facet provides a respective routing configuration to map the gate ouput cell between one or more of the gate input cells at the input plane 12 of the logic gate array. It is to be understood that each cell may be mapped precisely onto a complete cell (cell to cell mapping) or onto only part of a cell (cell shifted mapping). Also, as indicated above and show in FIG. 1, the cells may provide fan-out. The logic gate array in FIG. 1 is illustrated as having nine cells 14, each cell having nine logic gates 16. It will be appreciated that this lay-out is for the purposes of explanation and many other configurations are possible. The logic array is a non-linear device capable of performing binary logic operations, e.g. a NOR operation, and may be pixellated or non-pixelated. There is a Fourier transform relationship between the lenslet array 18 and the holographic array 24, and between the holographic array 24 and the input plane 12.

Figure 2:
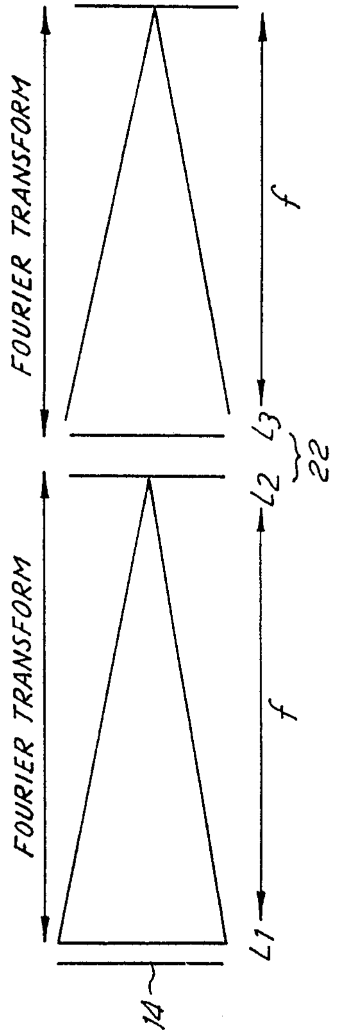
FIG. 2 is a schematic diagram representing the optics of a single cell in the logic gate array of FIG. 1.

FIG. 2 shows the optics relating to a single cell; the principles will apply to each cell of the array. In FIG. 2, the lenslet (corresponding to a facet 22 of array 24) Fourier transforms the light pattern from the outputs of the gates 16 in the associated cell 14 onto the corresponding facet 22 of the holographic array 24. For simplicity a facet having a fan-out of one is shown. A curvature is imposed on the fringes which is equivalent to that produced by a lens of focal length f/2. This is represented schematically by two lenses $L_2$ and $L_3$ each having a focal length of f. The lens $L_2$ corrects for the spherical wavefront of the Fourier Transform and $L_3$ performs a second Fourier transformation. The resulting optical pattern has a spherical wavefront but this does not need correction if the gate array is an intensity device.

An optical processing circuit is illustrated in FIG. 3. A LCLV logic gate array 26 defines the output and input planes 10 and 12 represented in FIG. 1. A laser 28 generates a beam which is expanded by a beam expander 30 and then made incident upon the gate output plane 10 by means of a beam splitter 32. The read beam 34 is then transmitted to the lenslet array 18 thence via the holographic array 24 to a beam splitter 36. The output from the holographic array 24 is reflected by beam splitter 36, via lens 38, mirrors 40, and 42 onto the input plane 12 of the logic gate array 26. The beam splitter 36 allows the optical input 'I' and the optical output '0' to be introduced into and removed from the system.

Referring now to FIG. 1, it will be noted that the connections within each cell are space invariant (i.e. all the gates within the same cell are presented with the same routing configuration) whilst the connections between each cell are space variant (i.e. each cell can have its own routing configuration). Thus only one hologram or facet 22 is required for each cell 14.

As to be described below, the system allows a number of identical interacting processing modules to be built up. The routing configurations between the cells determine the logic circuit common to all modules, and the connections between the modules. Even though the system does not require one facet for each gate, the system allows a great deal of flexibility.

Figures 4A, 4B, 4C, 4D:
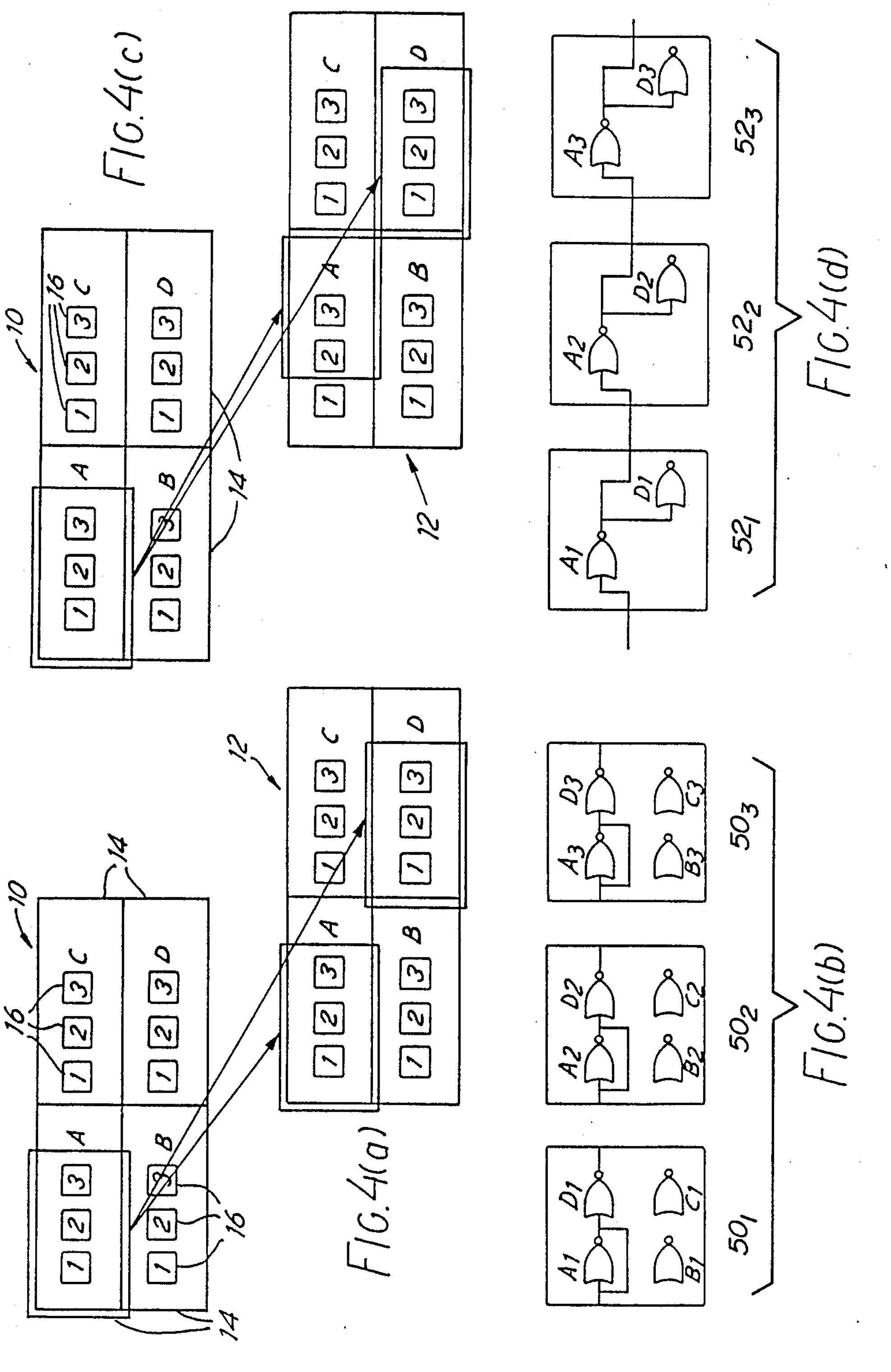
FIGS. 4*a*, 4*b*, 4*c* and 4*d* are diagrammatic representations for illustrating cell to cell mapping and cell-shifted mapping.

The construction of the non-interacting and interacting modules will now be described with reference to FIG. 4 which, for simplicity, shows a logic gate array with a 2×2 array of cells each containing three gates. FIG. 4a shows an arrangement where the holographic array provides cell to cell mapping (i.e. cells are mapped precisely onto other cells). In this case the outputs $A_o1$, $A_o2$, $A_o3$ of the three gates in output cell $A_o$ are mapped to inputs $A_i1$, $A_i2$, $A_i3$ of input cell $A_i$ and inputs $D_i1$, $D_i2$, $D_i3$ of input cell $D_i$ to provide a fan-out of 2. This defines three identical non-interacting modules (sub-circuits) $50_1$, $50_2$, $50_3$. Each module has four gates. The output of gate A is supplied to the input of gate D and also is fed back to the input of gate A. The modules are illustrated in FIG. 4*b* and it will be understood that the number of modules is equivalent to the number of gates in a cell and that the number of gates in each module is equivalent to the number of cells in the logic gate array. In general it is possible to implement an arbitrary set of identical modules in this manner, exploiting their regularity by forming identical connections in a space invariant fashion.

Interaction between the modules can be introduced by creating within cell shifts. For example, in FIG. 4*c*, outputs $A_o1$, $A_o2$ and $A_o3$ are mapped in cell to cell fashion to $D_i1$, $D_i2$, $D_i3$ and in cell-shifted fashion to $A_i2$, $A_i3$. Thus the output of $A_1$ is input to $A_2$; the output of $A_2$ is input to $A_3$; the output of $A_3$ overflows, and the modules $52_1$, $52_2$ and $52_3$, are interacting as seen in FIG. 4*d*. In this Figure, the gates B and C have been omitted from the modules for clarity.

Figure 5:
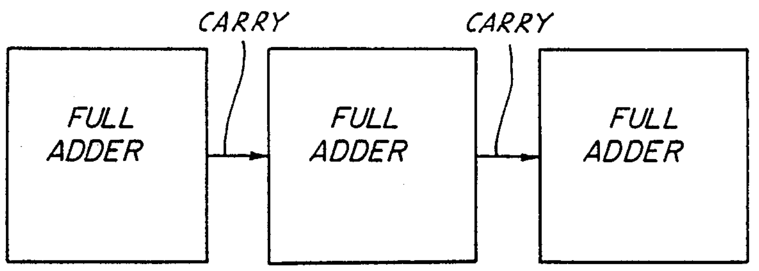
FIG. 5 is a block diagram representing a parallel adder.

In this way architectures such as a parallel adder can be implemented where each module is a full adder, as shown in FIG. 5.

Figure 6:
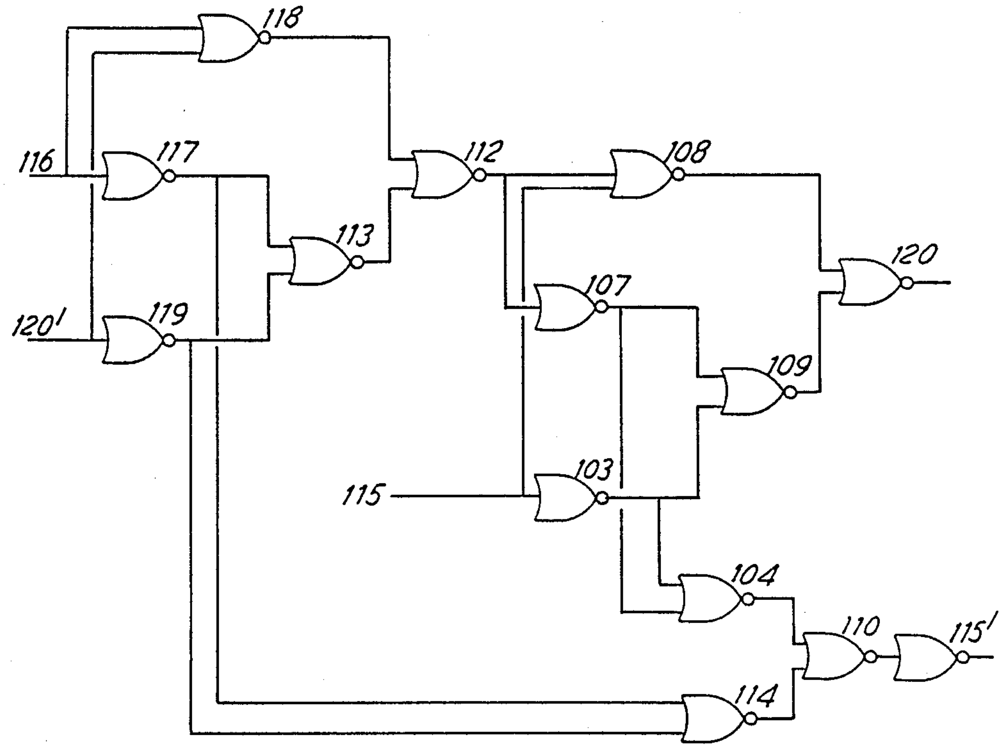
FIG. 6 is a logic circuit of a full adder.
Figure 7A:
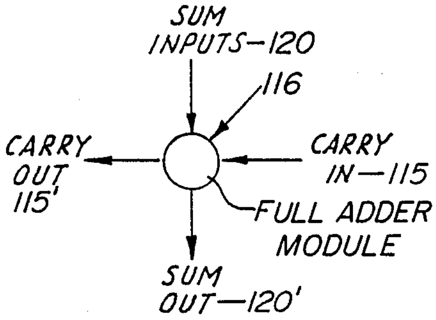
FIGS. 7*a* and 7*b* are diagrams illustrating a fast multiplier array.
Figure 7B:
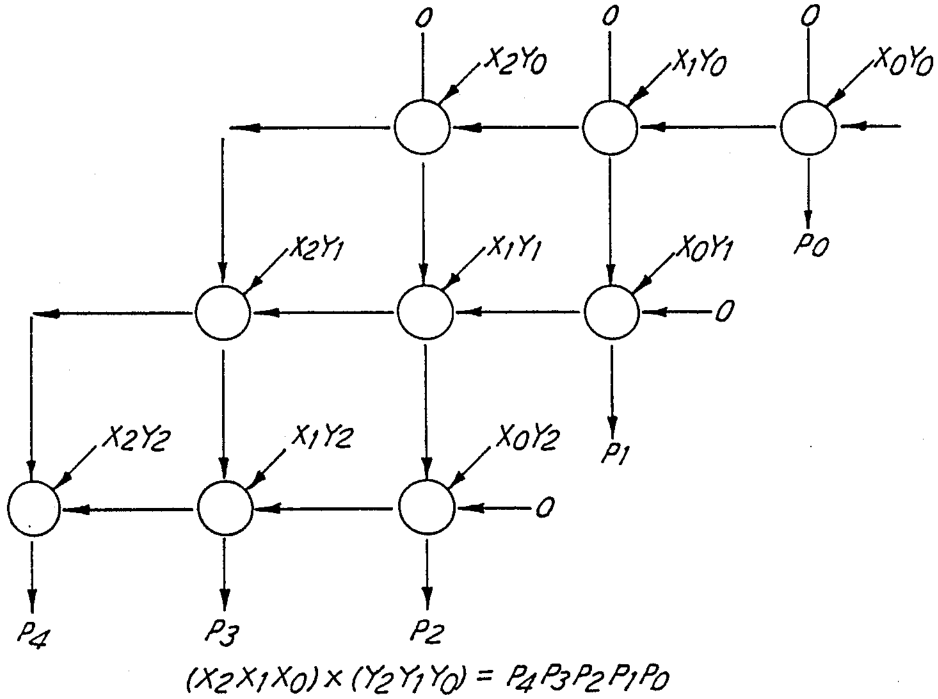

The construction of a fast multiplier will now be described with reference to FIGS. 6, 7*a* and 7*b*. FIG. 6 is a logic circuit of fourteen NOR gates interconnected to form a full adder, having an input at 116, a sum input at 120, a sum out at 120', a carry in at 115 and a carry out at 115'. The full adder of FIG. 7*a* is the basic module of the fast multiplier and is interconnected in a similar manner with other identical modules as shown in FIG. 7*b*. The array in FIG. 7*b* performs parallel multiplication of two number $X_2\ X_1\ X_o$ and $Y_2\ Y_1\ Y_o$, where the subscripts indicate the significance of the bits. The external inputs to the modules are the partial products $X_2Y_o$, $X_1Y_o$, $X_oY_o$, etc. and the modules interact through the partial sum 120 and carry 115. The bits $P_4$, $P_3$, $P_2$, $P_1$ and $P_o$ of the product are output as shown.

The module illustrated in FIG. 6, and its interactions shown in FIGS. 7*a* and 7*b*, can be achieved using an optical logic gate array of NOR gates and a cellular holographic array with the cells arranged to provide the appropriate routing configurations for each cell. The module and its interactions are constructed using the principles of cell to cell mapping and cell shifted mapping described above. In the case of the array of FIGS. 7*a* and 7*b*, it is clear that the majority of the connections in each module in FIG. 6 are between gates of the same module; for example the output of gate 119 is supplied to the inputs of gates 113 and 114 within the same module. For these types of connection, precise cell to cell mapping is required, in this particular case with a fan-out of 2. However the carry out gate 115' of each module needs to be connected to the carry in gate 115 of an adjacent module. Similarly sum out gate 120 needs to be connected to a sum input gate 120 of an adjacent gate. In FIGS. 7*a* and 7*b* this carry connection is to a horizontally adjacent module, whereas the sum connection is to a vertically adjacent module. The mapping of the cells representing gate 115 and 120 are (as explained in FIGS. 4(*c*) and 4(*d*)) shifted accordingly to provide the interactions required.

Figure 8A:
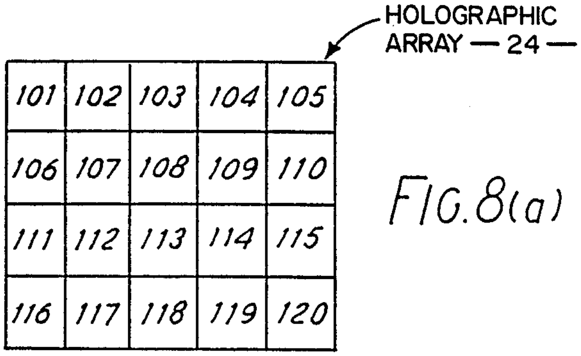
FIG. 8*a* is a diagram representing the cells in the holographic array and FIGS. 8*b* (1–4) illustrates the routing configurations implemented by some of the cells of the array.

FIG. 8*a* is a diagram identifying by number the cells in the holographic array, and FIGS. 8*b* (1–4) shows some of the routing configurations that are defined by the holographic array. For example, in FIG. 8(*b*) 1 output, cell 103 is mapped to the input of cell 103 and cell 109. This corresponds to the connections between the output of gate 103 and the inputs of gates 104 and 109 in each module. Similarly in FIG. 8(*b*) 2 output of gate 104 is connected to the input of gate 110 in each module and in FIG. 8(*b*) 3 the output of gate 107 is connected to the outputs of gates 104 and 109 in each module, and so on. The mapping of cell 120 in FIG. 8(*b*) 4 shows a cell shifted mapping from cell 120 to cells 118 and 119 (i.e. the cells are not precisely mapped). The mapping provides the appropriate cell shift so that the sum outputs from gate 120 are supplied to the sum input gate 119 of an adjacent full adder to provide the interaction shown in FIG. 6. Similarly, cell 115 is mapped in cell shifted fashion to cell 115 so that the carry out in each module is transferred to the carry in in the adjacent module as identified by FIG. 6. In this way the various connections between the cells provide the required intra module connections and inter module connections.

As mentioned above, the number of cells is equivalent to the number of facets required for the hologram. The number of modules is determined solely by the number of gates in each cell and is independent of this number of hologram facets. The result is that, in the example of multiplier array described above, which requires $N^2$ modules where N is the number of bits of the numbers to be multiplied, the number of facets necessary remains the same whether the numbers to be multiplied are 8, 16 or 32 bit numbers. This is because the construction of the modules (i.e. the full adders) remains the same for all types of multiplication. All that is necessary to cope with higher resolution numbers is to increase the number of modules. The number of modules is equivalent to the number of logic gates in each cell of the logic gate array. Thus to provide additional modules, the number of logic gates in each cell is increased. For example, in the fast multiplier array of FIG. 6, nine modules are required for the multiplication of three bit numbers, and thus nine logic gates per cell are required. Sixteen bit numbers could be multiplied using the same holographic array merely by increasing the number of gates per cell to 256. The number of gates per cell is limited only by the resolution of the logic gate array rather than by the space bandwidth product of the holograph array.

It will be seen that the present arrangement relies on the principle of subdividing the logic array into notional cells and then mapping these cells in space variant fashion whilst the gate outputs within each cell are mapped in space invariant fashion. This arrangement exploits the symmetry of the architecture of regular algorithms.

Figure 9:
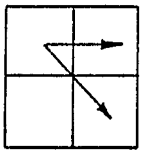
FIG. 9 represents a system for performing a digital image processing algorithm.
Figure 9:
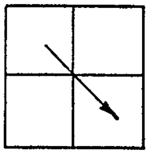
Figure 9:
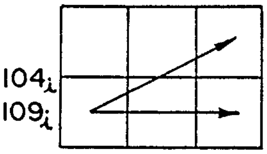
Figure 9:
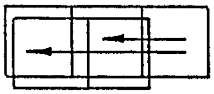
Figure 9:
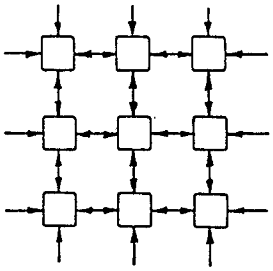

For example, FIG. 9 represents a system for performing a digital image processing algorithm. Each module in this case acts as a processor for an individual pixcel and, in the simple case, each pixcel is input to a logic gate. Boolean type operations such as used in the Shrink-Expand algorithm are particularly straightforward to implement (see Rosenfeld and Kak, "Digital Picture Processing", Vol. 2, Academic Press). By cascading holographic arrays it is possible to construct circuits with a large number of identical connections and with far fewer holographic facets than the number of logic gates required for the circuit.

The holographic arrays may be computer generated holograms or they may be formed optically. Optical generation can be done by sequential exposure under stepper motor control. A suitable system may include a holographic plate controlled in two directions by linear motors and a mirror mounted on a two axis gimbal to move the object wave. An example of a suitable form of apparatus for optically forming the holographic array is disclosed in U.S. Pat. No. 4,455,061.

We claim:

1. An optical processor including a series of M similar logic modules, each logic module comprising N logic gates and a set of connections between a plurality of logic gates within each logic module, the set of connections being the same for each logic module, said logic modules being connected with each other to form an optical processor, said logic modules and said connections comprising:

a logic gate array having an input plane and an output plane, including (N×M) logic gates, each logic gate having an input and an output on the input plane and the output plane, respectively, and said logic gates arranged in the form of N cells, each cell including M logic gates, the number of cells (N) defining the number of gates in each module of the optical processor and the number of gates (M) in each cell defining the number of modules in the processor; and a holographic array having M facets, each facet having incident thereon output signals from a respective associated cell of said logic gate array, each of said facets comprising means for providing a predetermined mapping function and for causing output signals from said associated cell to be mapped onto said input plane of the array, at least one of said facets comprising a means for providing a cell-to-cell mapping function and for causing all outputs from an associated cell to be mapped onto the corresponding inputs of a respective predetermined cell, and at least one of said facets comprising a means for providing a cell-shifted mapping function which causes only some of said outputs from an associated cell to be mapped onto the inputs of a respective predetermined cell, wherein said at least one facet comprising means for providing a cell-to-cell mapping function determines said set of connections between logic gates within each logic module and said at least one facet comprising means for providing a cell-shifted mapping function determines the connections between said logic modules.

2. An optical processor as claimed in claim 1, which includes focussing means for focussing the output of each cell onto the respective facet of the holographic array.

3. An optical processor as claimed in claim 2, wherein said focussing means comprises a lenslet array, each lenslet of the array focussing the output of a cell onto the respective facet of the holographic array.

4. An optical processor as claimed in claim 3, wherein said lenslet array comprises an array of diffractive elements.

5. An optical processor as claimed in claim 3 wherein said lenslet array comprises an array of refractive elements.

6. An optical processor as claimed in claim 1, wherein said logic gate array comprises a liquid crystal light valve.

7. An optical processor according to claim 1, wherein each of said logic modules is a full adder and said modules comprise a multiplier array.

8. A method of processing optical data, comprising the steps of:

providing a logic gate array having an input plane and output plane, said logic gate array including a plurality of logic gates, each gate having an input and an output in the input plane and the output plane, respectively;

grouping said logic gates on said logic gate array into a series of N cells, each cell containing M logic gates;

mapping the outputs of said logic gates of at least one of said cells onto the input plane of the array in cell-to-cell fashion such that all outputs of a cell-to-cell mapped cell are mapped onto the corresponding inputs of a respective predetermined cell; and mapping the outputs of the logic gates of at least one of said cells onto the input plane array in cell-shifted fashion so that only some of the outputs from a cell-shifted mapped cell are mapped onto the corresponding inputs of a respective predetermined cell, whereby a series of M similar interconnected logic modules are defined, each logic module comprising N logic gates and a set of connections between a plurality of logic gates within the module, said set of connections being the same for each module.

* * * * *